United States Patent [19]
Choi et al.

[11] Patent Number: 5,495,346
[45] Date of Patent: Feb. 27, 1996

[54] ELEMENT GENERATOR FOR DITHER MATRIX AND A DITHERING APPARATUS USING THE SAME

[75] Inventors: Byung-kyun Choi, Suwon; Kil-su Eo, Seoul; Dae-hyun Jin, Suwon, all of Rep. of Korea

[73] Assignee: Samsung Electronics Co., Ltd., Kyungki, Rep. of Korea

[21] Appl. No.: 271,631

[22] Filed: Jul. 7, 1994

[30] Foreign Application Priority Data

Oct. 30, 1993 [KR] Rep. of Korea .................. 1993-22955

[51] Int. Cl.$^6$ ............................ H03M 1/12; H04N 1/40; G09G 3/20; H03K 19/00
[52] U.S. Cl. .......................... 358/457; 326/52; 326/104; 348/574; 345/55; 327/76; 364/757; 364/784; 340/146.2
[58] Field of Search .................... 307/440, 471; 364/786, 787, 757, 721, 784; 340/146.2; 358/457, 460; 348/574; 345/55; 327/76

[56] References Cited

U.S. PATENT DOCUMENTS

| | | | |
|---|---|---|---|
| 3,739,082 | 6/1973 | Lippel | 348/574 |
| 3,925,609 | 12/1975 | Ninke | 327/76 |
| 3,959,583 | 5/1976 | Judice et al. | 327/76 |
| 3,967,052 | 6/1976 | Judice | 358/261.1 |
| 3,975,584 | 8/1976 | Gordon | 348/574 |
| 4,447,803 | 5/1984 | Crosby et al. | 348/574 |
| 4,965,668 | 10/1990 | Abt et al. | 348/574 |
| 5,166,809 | 11/1992 | Surbrook | 358/460 |

*Primary Examiner*—Edward L. Coles, Sr.
*Assistant Examiner*—Kimberly A. Williams
*Attorney, Agent, or Firm*—Leydig, Voit & Mayer

[57] ABSTRACT

An element generator for a dither matrix comprises a logic device which receives a row address and a column address and performs a logic operation thereon so as to produce a dither element corresponding to the row address and the column address, which is implemented at low cost and has an advantage in that the processing speed is increased. The dithering apparatus comprises a dither-matrix element generator, a comparator, an adder and a selector. The comparator compares the output of the dither-matrix element generator with lower-bit data of the original image data. The adder adds a predetermined number to upper-bit data of the original image data. The selector selects one between the upper-bit data and the adder output, in accordance with the output of the comparator, so as to produce the selected one as the dithered image data. Dithering is thereby performed via hardware, which leads to an increased processing speed.

5 Claims, 3 Drawing Sheets

5,495,346

ELEMENT GENERATOR FOR DITHER MATRIX AND A DITHERING APPARATUS USING THE SAME

BACKGROUND OF THE INVENTION

The present invention relates to an element generator for a dither matrix and a dithering apparatus using the same, and more particularly to a dithering apparatus to be used for improving the image quality in an image outputting device having a low gray-scale characteristic.

Generally speaking, image outputting devices can be classified into a static image outputting device and a dynamic image outputting device. The static image outputting device, e.g., a plotter, ink jet printer, dot printer or laser printer generates a motionless image, while the dynamic image outputting device, e.g., a television receiver and computer monitor, generates a time-variant image. For various reasons, the above image outputting devices are restricted in terms of gray scale. For example, the gray scale of a liquid crystal monitor is severely restricted due to the characteristics of the liquid crystal itself. Similarly, the gray scale of a dot printer is determined by the number of dots which can be represented in the unit area. Thus, most image outputting devices are restricted in terms of gray scale, due to a correlation between their own characteristics and the resolution required. In addition, the gray scale may also be restricted based on the limitations of an image signal processor for outputting. For example, if an original image signal to be processed is represented by eight bits but the image signal processor is limited to only four bits, the gray scale is thereby restricted.

It is apparent that a lower gray scale diminishes image quality accordingly. Specifically, false contour generation and mach band effects are prevalent phenomena in systems having a low gray scale and lead to reduced image quality. Therefore, various algorithms have been proposed for overcoming these phenomena; for example, dithering, which prevents image quality reduction by adding randomly distributed noise to the original image.

Conventional dithering, however, is performed by software, which leads to the reduction of the processing speed. In particular, when a dither element to be used in the dithering process is generated by software, the reduction of the image processing speed is significant. This reduction in processing speed is quite remarkable in the field of computer graphics and results in unacceptably slow processing speeds. Hence, for increasing the image processing speed, the look-up table technique is employed as a hardware implementation of the dither matrix. However, the cost involved with such a look-up table, which is generally implemented by ROM memory elements, is excessive.

SUMMARY OF THE INVENTION

Accordingly, the object of the present invention is to provide an element generator for a dither matrix, which has a simple hardware structure and can be operated at high speed.

The other object of the present invention is to provide a dithering apparatus which includes the above element generator and can be operated at high speed.

To attain the above objects, the present invention provides a dithering apparatus for converting an M-bit original image into N-bit dithered data, comprising:

a dither-matrix element generator for performing a logic operation on a row address and a column address related to the original image so as to produce a corresponding element of the dither matrix;

a comparator for comparing the output of the element generator with the data composed of the (M-N)th bit through (M-N-L+1)th bit of the original image data, provided that the output of the element generator is composed of L bits;

an adder for adding a predetermined number to the upper N bits of the original image data; and a selector for selecting one between the upper N bits of the original image data and the output of the adder, in accordance with the output of the comparator, so as to produce the selected one as the N-bit dithered image data.

Also, the dithering apparatus further comprises a mask circuit for converting the output of the adder into the maximized N-bit value, when an overflow occurs in the adder. The mask circuit is composed of a plurality of logic OR gates each for performing a logic OR operation with a carry signal and one bit of the output of the adder.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First of all, for better comprehension of the present invention, a dither matrix will be simply explained.

A dither matrix $D^{(n)}$ is defined by the following equation (1).

$$D^{(n/2)} = \begin{pmatrix} 4D^{(n/2)} + D_{00}^{(2)}U^{(n/2)} & 4D^{(n/2)} + D_{01}^{(2)}U^{(n/2)} \\ 4D^{(n/2)} + D_{10}^{(2)}U^{(n/2)} & 4D^{(n/2)} + D_{11}^{(2)}U^{(n/2)} \end{pmatrix} \quad (1)$$

wherein $$D^{(2)} = \begin{pmatrix} D_{00}^{(2)} & D_{01}^{(2)} \\ D_{10}^{(2)} & D_{11}^{(2)} \end{pmatrix} = \begin{pmatrix} 0 & 2 \\ 3 & 1 \end{pmatrix}$$

and $$U^{(n)} = \begin{pmatrix} 1 & 1 & \ldots & 1 \\ 1 & 1 & \ldots & 1 \\ . & . & . & . \\ . & . & . & . \\ . & . & . & . \\ 1 & 1 & \ldots & 1 \end{pmatrix}$$

For example, a 4×4 dither matrix (or $D^{(4)}$) is represented thus:

$$D^{(4)} = \begin{pmatrix} 4D^{(2)} + D_{00}^{(2)}U^{(2)} & 4D^{(2)} + D_{01}^{(2)}U^{(2)} \\ 4D^{(2)} + D_{10}^{(2)}U^{(2)} & 4D^{(2)} + D_{11}^{(2)}U^{(2)} \end{pmatrix}$$

$$= \begin{pmatrix} 4\begin{pmatrix} 0 & 2 \\ 3 & 1 \end{pmatrix} & 4\begin{pmatrix} 0 & 2 \\ 3 & 1 \end{pmatrix} + 2\begin{pmatrix} 1 & 1 \\ 1 & 1 \end{pmatrix} \\ 4\begin{pmatrix} 0 & 2 \\ 3 & 1 \end{pmatrix} + 3\begin{pmatrix} 1 & 1 \\ 1 & 1 \end{pmatrix} & 4\begin{pmatrix} 0 & 2 \\ 3 & 1 \end{pmatrix} + \begin{pmatrix} 1 & 1 \\ 1 & 1 \end{pmatrix} \end{pmatrix}$$

$$= \begin{pmatrix} \begin{pmatrix} 0 & 8 \\ 12 & 4 \end{pmatrix} & \begin{pmatrix} 0 & 8 \\ 12 & 4 \end{pmatrix} + \begin{pmatrix} 2 & 2 \\ 2 & 2 \end{pmatrix} \\ \begin{pmatrix} 0 & 8 \\ 12 & 4 \end{pmatrix} + \begin{pmatrix} 3 & 3 \\ 3 & 3 \end{pmatrix} & \begin{pmatrix} 0 & 8 \\ 12 & 4 \end{pmatrix} + \begin{pmatrix} 1 & 1 \\ 1 & 1 \end{pmatrix} \end{pmatrix}$$

$$= \begin{pmatrix} 0 & 8 & 2 & 10 \\ 12 & 4 & 14 & 6 \\ 3 & 11 & 1 & 9 \\ 15 & 7 & 13 & 5 \end{pmatrix}$$

In the above dither matrix, provided that X represents the row address and Y represents the column address, the elements $D^{(4)}(X,Y)$ of the 4×4 dither matrix are represented as:

$D^{(4)}(0,0) = 0 \quad D^{(4)}(0,1) = 8 \quad D^{(4)}(0,2) = 2 \quad D^{(4)}(0,3) = 10$ $D^{(4)}(1,0) = 12 \quad D^{(4)}(1,1) = 4 \quad D^{(4)}(1,2) = 14 \quad D^{(4)}(1,3) = 6$ $D^{(4)}(2,0) = 3 \quad D^{(4)}(2,1) = 11 \quad D^{(4)}(2,2) = 1 \quad D^{(4)}(2,3) = 9$ $D^{(4)}(3,0) = 15 \quad D^{(4)}(3,1) = 7 \quad D^{(4)}(3,2) = 13 \quad D^{(4)}(3,3) = 5$ When a look-up table is adopted for generating the elements of the above dither matrix, a $16 \times 2^4$ memory is required.

Figure 1:
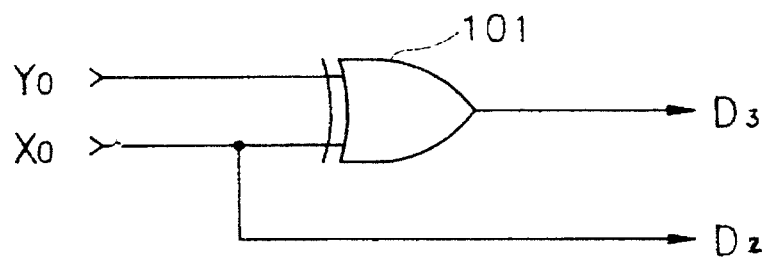
FIG. 1 is a logic circuit diagram of a dither-matrix element generator according to one embodiment of the present invention, which represents the logic circuit for generating the elements for a 4×4 dither matrix.
Figure 1:
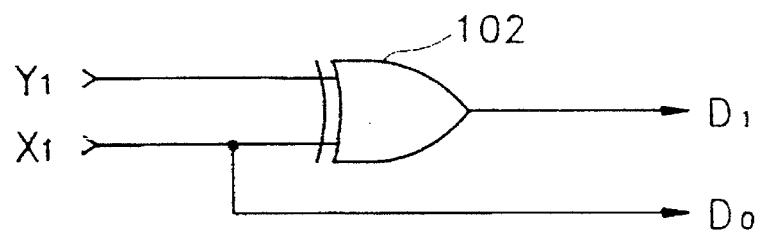

FIG. 1 is a logic circuit diagram of the dither-matrix element generator according to one embodiment of the present invention, which represents the logic circuit for generating elements for a 4×4 dither matrix. Here, the element generator includes two XOR gates 101 and 102. Referring to FIG. 1, the binary representation of the inputs (row address and column address) and the output are shown in Table 1.

TABLE 1

| row address $X_1X_0$ | column address $Y_1Y_0$ | element of dither matrix $D_3D_2D_1D_0$ |
|---|---|---|
| 00 | 00 | 0000 |
| 00 | 01 | 1000 |
| 00 | 10 | 0010 |
| 00 | 11 | 1010 |
| 01 | 00 | 1100 |
| 01 | 01 | 0100 |
| 01 | 10 | 1110 |

TABLE 1-continued

| row address $X_1X_0$ | column address $Y_1Y_0$ | element of dither matrix $D_3D_2D_1D_0$ |
|---|---|---|
| 01 | 11 | 0110 |
| 10 | 00 | 0011 |
| 10 | 01 | 1011 |
| 10 | 10 | 0001 |
| 10 | 11 | 1001 |
| 11 | 00 | 1111 |
| 11 | 01 | 0111 |
| 11 | 10 | 1101 |
| 11 | 11 | 0101 |

Based on the binary representation of Table 1, the output bits can be represented by a function of input bits. These relationships are as follows.

$D_0 = X_1$ \hfill (2)

$D_1 = X_1 \oplus Y_1$ \hfill (3)

$D_2 = X_0$ \hfill (4)

$D_3 = X_0 \oplus Y_0$ \hfill (5)

Based on the above equations (2) through (5), the dither-matrix element generator is implemented by XOR gates 101 and 102. That is, XOR gate 101 performs the logic exclusive-OR operation corresponding to the above equation (5) and XOR gate 102 performs the logic exclusive-OR operation corresponding to the above equation (3).

For instance, if the row address $(X_1X_0)$ is "00" and the column address $(Y_1Y_0)$ is "01," then the following statements are true.

$D_0 = 0$ $D_1 = X_1 \oplus Y_1 = 0 \oplus 0 = 0$ $D_2 = 0$ $D_3 = X_0 \oplus Y_0 = 0 \oplus 1 = 1$ That is, a binary "8" is generated, i.e., "1000."

Figure 2:
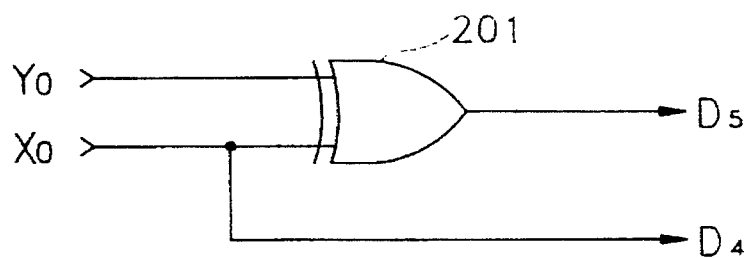
FIG. 2 is a logic circuit diagram of a dither-matrix element generator according to another embodiment of the present invention, which represents the logic circuit for generating the elements for an 8×8 dither matrix.
Figure 2:
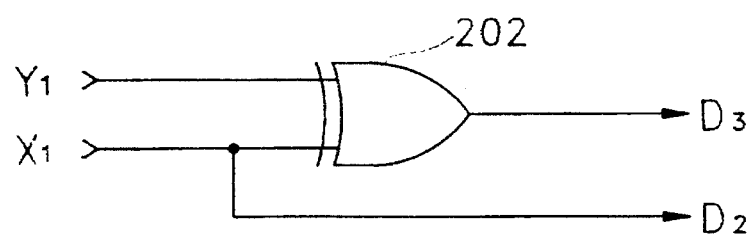
Figure 2:
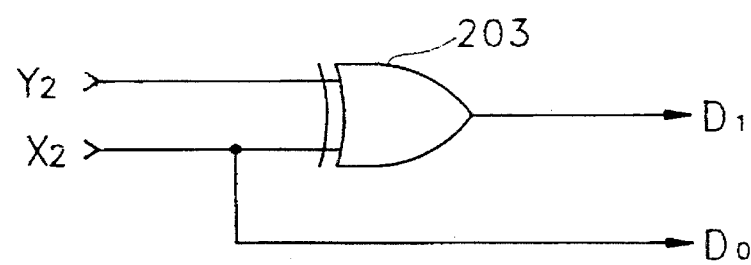

FIG. 2 is a logic circuit diagram of a dither-matrix element generator according to another embodiment of the present invention, which represents the logic circuit for generating elements for an 8×8 dither matrix. The dither-matrix element generator of FIG. 2 includes three XOR gates 201, 202 and 203.

The 8×8 dither matrix constructed based on Equation (1) is as follows.

$$D^{(8)} = \begin{pmatrix} 0 & 32 & 8 & 40 & 2 & 34 & 10 & 42 \\ 48 & 16 & 56 & 24 & 50 & 18 & 58 & 26 \\ 12 & 44 & 4 & 36 & 14 & 46 & 6 & 38 \\ 60 & 28 & 52 & 20 & 62 & 30 & 54 & 22 \\ 3 & 35 & 11 & 43 & 1 & 33 & 9 & 41 \\ 51 & 19 & 59 & 27 & 49 & 17 & 57 & 25 \\ 15 & 47 & 7 & 39 & 13 & 45 & 5 & 37 \\ 63 & 31 & 55 & 23 & 61 & 29 & 53 & 21 \end{pmatrix}$$

If the consideration of the relationship between the row address, the column address and its corresponding element of the above matrix is made based on the their binary representation, elements bits $D_5$, $D_4$, $D_3$, $D_2$, $D_1$ and $D_0$ of the dither matrix can be represented as the following.

$D_5 = X_0 \oplus Y_0$ \hfill (6)

$$D_4 = X_0 \quad (7)$$

$$D_3 = X_1 \oplus Y_1 \quad (8)$$

$$D_2 = X_1 \quad (9)$$

$$D_1 = X_2 \oplus Y_2 \quad (10)$$

$$D_0 = X_2 \quad (11)$$

In FIG. 2, XOR gate 201 performs the logic exclusive-OR operation related to the equation (6), XOR gate 202 performs the logic exclusive-OR operation related to the equation (8), and XOR gate 203 performs the logic exclusive-OR operation related to the equation (10).

Similarly, the element generators for higher-order dither matrices (e.g., $D^{(16)}$, $D^{(32)}$ and $D^{(64)}$) can be implemented.

As shown in the above description, the dither-matrix element generator can be implemented by very few logic devices (i.e., XOR gates), which results in cutting down on the cost for hardware implementation and increasing the operation speed.

Figure 3:
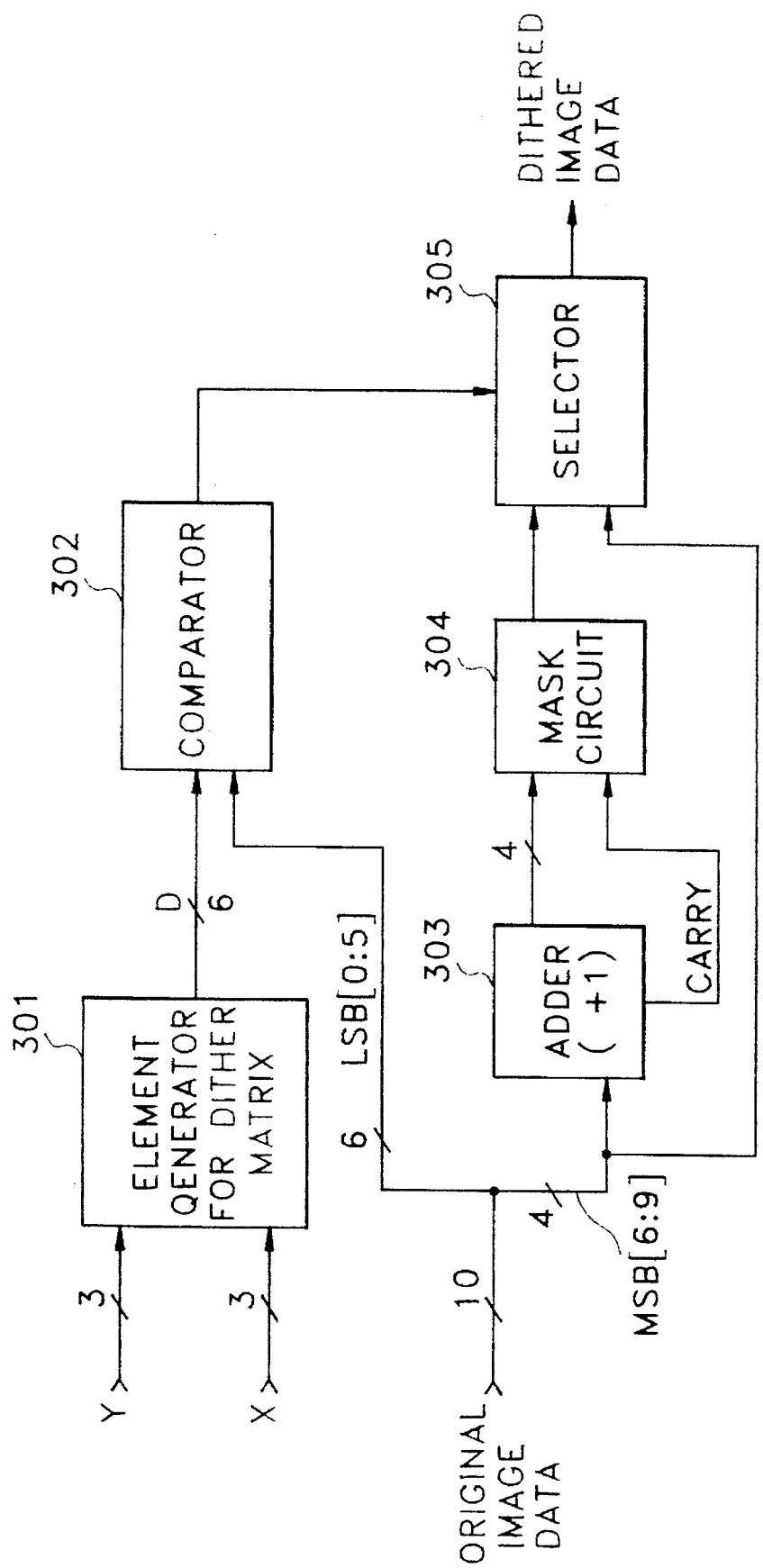
FIG. 3 is a block diagram of a dithering apparatus of the present invention.

FIG. 3 is a block diagram of a dithering apparatus of the present invention, wherein the dithering apparatus includes a dither-matrix element generator 301, a comparator 302, an adder 303, a mask circuit 304 and a selector 305.

Here, for the convenience of explanation, we will consider the case that 10-bit original image data is changed into 4-bit image data by dithering.

Referring to FIG. 3, dither-matrix element generator 301 receives a row address and a column address and then produces its corresponding element of the 8×8 dither matrix (hereinafter referred to as the dither element). Here, the row address and column address to be applied to dithering matrix element generator 301 are obtained by modulating an image row address and an image column address corresponding to the original image data. For example, provided that the image row address and the image column address are denoted as IX and IY, respectively, the row address X and the column address Y related to the dither-matrix element generator 301 may be produced by the following method.

$$X = IX \bmod 8$$

$$Y = IY \bmod 8$$

Though this modulation can be performed using software, it is also possible to use the three lower bits of the image row address and the three lower bits of the image column address as the inputs of dither-matrix element generator 301.

The dither element produced from dither-matrix element generator 301 is applied to comparator 302. Comparator 302 compares the six lower bits of the original image data with the dither element, and the compared result is applied to selector 305 as a selecting control signal. For example, if the value of dither element is higher than that composed by the six lower bits of the original image data, comparator 302 produces a logic "1," and otherwise produces a logic "0." Here, the image data applied to comparator 302 is composed of L bits, which corresponds to the (M-N)th bit to the (M-N-L+1)th bit of the original image data, provided that the original image data is composed of M bits, the dithered image data is composed of N bits and the output of dither-matrix element generator 301 is composed of L bits.

Meanwhile, the four upper bits of the original image data are applied to both adder 303 and selector 30.5. Adder 303 adds a predetermined number (for example, one) to the received four upper bits of the original image data so as to produce an output. Mask circuit 304 modulates the output of adder 303 into the maximum 4-bit value, when an overflow is generated in adder 303. In other words, when the carry is generated from adder 303, the output of mask circuit 304 is "1111." Thus, mask circuit 304 may be implemented as shown in FIG. 4.

Figure 4:
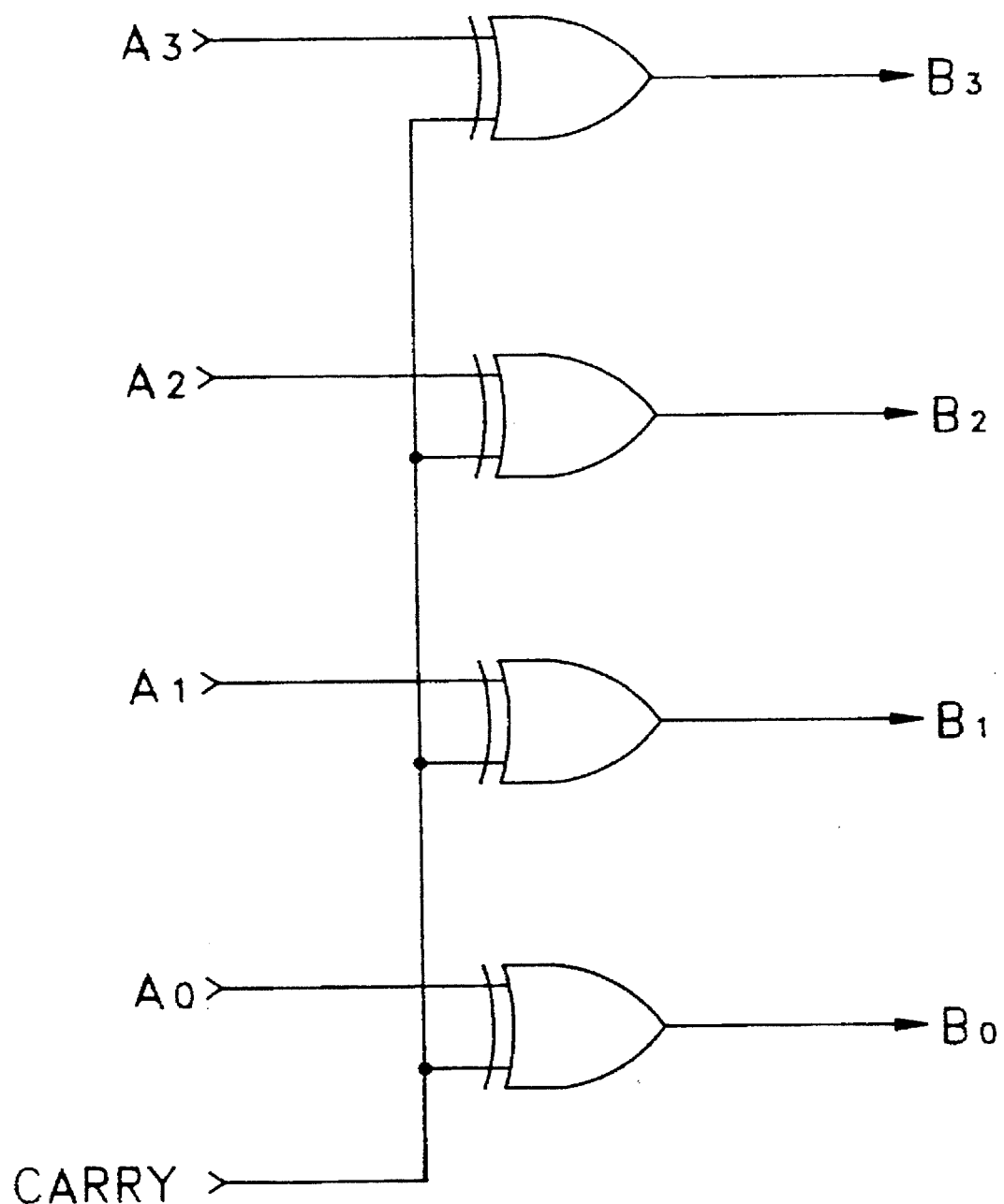
FIG. 4 is a detailed logic diagram of the mask circuit shown in FIG. 3.

Referring to FIG. 4, OR gates 401, 402, 403 and 404 each perform a logic OR operation with regard to one bit of the adding result ($A_3$, $A_2$, $A_1$ or $A_0$) and a carry signal produced from adder 303, so as to produce the result thereof.

Referring back to FIG. 3, selector 305 selects one between the output ($B_3$, $B_2$, $B_1$ or $B_0$) of mask circuit 304 and the four upper bits of the original image data, in accordance with the output of comparator 302.

If the dithering apparatus is by the above hardware, the processing speed thereof is increased. In particular, the dithering is operation related to the image outputting device and is performed not once but is repeated many times. In addition, in the field of computer graphics, increasing the processing speed is essential for interface with a user. Accordingly, the element generator for a dither matrix and the dithering apparatus using the same have a more remarkable effect in the field of computer graphics than other fields. Particularly, the dither-matrix element generator can be implemented by only a few logic elements, which leads to a reduction in cost while greatly increasing the processing speed beyond that achieved with ROM memory elements.

Though explained in terms of detailed embodiments, the present invention is not limited to the above-described embodiments, but can be modified and improved within the scope of knowledge of the ordinarily skilled artisan in this field.

What is claimed is:

1. A dithering apparatus for converting an M-bit original image into N-bit dithered data where M is greater than N, comprising:

an element generator for a dither matrix for performing a logic operation on a row address and a column address related to the original image to produce a corresponding element of the dither matrix;

a comparator for comparing the output of said element generator with data composed of the (M-N)th bit through the (M-N-L+1)th bit of original image data, provided that the output of said element generator is composed of L bits;

an adder for adding a predetermined number to data composed of the upper N bits of the original image data; and a selector for selecting one between the data composed of N upper bits of the original image data and the output of said adder in accordance with the output of said comparator, to produce the selected one as the N-bit dithered image data.

2. The dithering apparatus according to claim 1, further comprising a mask circuit for converting the output of said adder into maximized N-bit value when an overflow occurs in said adder.

3. The dithering apparatus according to claim 2, wherein said mask circuit comprises a plurality of logic OR gates, each logic OR gate for performing a logic OR operation with a carry signal and one bit of the output of said adder.

4. The dithering apparatus according to claim 1, wherein the predetermined number to be added is one.

5. A dithering apparatus for converting an original image into dithered data, comprising:

an element generator for a dither matrix for performing a logic operation on a row address and a column address related to original image data by bits to produce a corresponding element of the dither matrix;

a comparator for comparing the output of said element generator with data composed of lower bits of the original image data;

an adder for adding a predetermined number to data composed of upper bits of the original image data; and a selector for selecting one between the data composed of upper bits of the original image data and the output of said adder in accordance with the output of said comparator, to produce the selected one as the dithered image data.

* * * * *

UNITED STATES PATENT AND TRADEMARK OFFICE
CERTIFICATE OF CORRECTION

PATENT NO. : 5,495,346
DATED : February 27, 1996
INVENTOR(S) : Choi et al.

It is certified that error appears in the above-indentified patent and that said Letters Patent is hereby corrected as shown below:

Item: 57; delete "abstract in its entirety" and insert the following:

--A dithering apparatus is provided including a dither-matrix element generator, a comparator, an adder and a selector. The dither-matrix element generator includes a logic device which receives a row address and a column address and performs a logic operation the received data bits so as to produce a dither element corresponding to the row address and column address. The comparator compares the output of the dither-matrix element generator with lower bit data of an original image. The adder adds a predetermined number to upper bit data of the original image. The selector selects one between the upper bit data and the adder output, in accordance with the output of the comparator, so as to produce the selected one as the dithered data.

UNITED STATES PATENT AND TRADEMARK OFFICE
CERTIFICATE OF CORRECTION

PATENT NO. : 5,495,346
DATED : February 27, 1996
INVENTOR(S) : Choi et al.

It is certified that error appears in the above-indentified patent and that said Letters Patent is hereby corrected as shown below:

```
    Dithering is thereby performed using low cost hardware
which exhibits increased processing speed--.
```

Signed and Sealed this

Ninth Day of July, 1996

Attest:

BRUCE LEHMAN

*Attesting Officer*      Commissioner of Patents and Trademarks